United States Patent
Johnson

(10) Patent No.: US 8,995,227 B1
(45) Date of Patent: Mar. 31, 2015

(54) SYSTEMS AND METHODS OF PROCESSING INFORMATION REGARDING WEAPON FIRE LOCATION USING PROJECTILE SHOCKWAVE AND MUZZLE BLAST TIMES OF ARRIVAL DATA

(75) Inventor: Murphey L. Johnson, Austin, TX (US)

(73) Assignee: ShotSpotter, Inc., Newark, CA (US)

( * ) Notice: Subject to any disclaimer, the term of this patent is extended or adjusted under 35 U.S.C. 154(b) by 670 days.

(21) Appl. No.: 13/210,365

(22) Filed: Aug. 15, 2011

Related U.S. Application Data

(60) Provisional application No. 61/373,872, filed on Aug. 15, 2010.

(51) Int. Cl.
*G01S 3/80* (2006.01)

(52) U.S. Cl.
USPC .......................................... 367/127; 367/906

(58) Field of Classification Search
CPC ................................ G01S 5/20; G01S 3/8083
USPC ............................................................ 367/127
See application file for complete search history.

(56) References Cited

U.S. PATENT DOCUMENTS

| | | | |
|---|---|---|---|
| 5,241,518 A | 8/1993 | McNelis et al. | |
| 5,554,129 A | 9/1996 | Stevenson | |
| 5,586,086 A | 12/1996 | Permuy et al. | |
| 5,912,862 A | 6/1999 | Gustavsen et al. | |
| 5,930,202 A | 7/1999 | Duckworth et al. | |
| 6,178,141 B1 | 1/2001 | Duckworth et al. | |
| 7,190,633 B2 | 3/2007 | Brinn et al. | |
| 7,359,285 B2 | 4/2008 | Barger | |
| 7,408,480 B2 | 8/2008 | Woo et al. | |
| 7,423,934 B1 * | 9/2008 | Uzes | 367/135 |
| 7,433,266 B2 | 10/2008 | Ledeczi et al. | |
| 7,474,589 B2 | 1/2009 | Showen et al. | |
| 7,755,495 B2 | 7/2010 | Baxter et al. | |
| 2005/0035897 A1 * | 2/2005 | Perl et al. | 342/29 |
| 2008/0267012 A1 * | 10/2008 | Fisher et al. | 367/127 |
| 2011/0122730 A1 * | 5/2011 | Damarla | 367/127 |

* cited by examiner

*Primary Examiner* — Mark Hellner
*Assistant Examiner* — Hovhannes Baghdasaryan
(74) *Attorney, Agent, or Firm* — DLA Piper LLP

(57) ABSTRACT

Systems and method of processing information regarding weapon fire are set forth herein. In one exemplary implementation, a method of processing information regarding weapon fire, such as determining weapon fire location using projectile shockwave and muzzle blast time(s) of arrival data is disclosed.

27 Claims, 9 Drawing Sheets

SYSTEMS AND METHODS OF PROCESSING INFORMATION REGARDING WEAPON FIRE LOCATION USING PROJECTILE SHOCKWAVE AND MUZZLE BLAST TIMES OF ARRIVAL DATA

CROSS-REFERENCE TO RELATED APPLICATION(S)

This application claims the benefit and priority of U.S. provisional application No. 61/373,872, filed Aug. 15, 2010, which is incorporated herein by reference in entirety.

BACKGROUND

1. Field

The present invention relates to processing information regarding weapon fire, and, more particularly, to systems and methods of processing information regarding weapon fire, such as determining weapon fire location using projectile shockwave and muzzle blast time(s) of arrival data.

2. Description of Related Information

Some gunshot detection systems use muzzle-blast arrival times to locate gunshots. They apply multilateration techniques to solve for a shot time and location to best match the pulse arrival times. For each pair of sensors, the speed of sound and difference between arrival times define a hyperbola representing the locus of potential shooter locations. In a hypothetical situation with no sensor location or time measurement error and an exactly known, uniform speed of sound, the actual shooter location would be the geometric intersection of the hyperbolas defined by each combination of sensor pairs. In real application, the hyperbolas do not intersect perfectly, so a least-squares minimization is used to find the best fit for all measured data. Such a system can be highly accurate when widely dispersed sensor arrays encompass the coverage area. For a shooter outside the array, however, fewer sensors tend to detect the shot, decreasing the probability of having enough detections to compute a location. Even with a sufficient number of detections to attempt to find hyperbolic intersections, the arms of the hyperbolas in the direction of the shooter tend toward parallel. With even small amounts of measurement error, the expected intersection point becomes indistinct, resulting in poor location accuracy, particularly in range estimation.

Better accuracy can be obtained for muzzle-blast detections outside the array when the sensors report a direction of arrival in addition to the time of arrival. With the bearing to the shooter known from at least two locations, the problem can go from multilateration to much simpler triangulation, or a hybrid approach that combines elements of both. A directional sensor typically requires a small array of microphones with fixed relative locations. The absolute orientation of this small array must be known in order to convert from a relative arrival direction to an absolute arrival direction. Such a sensor is significantly more complex and expensive than a single-microphone sensor. This is particularly true for mobile sensors, as not only the position, but also the orientation, must be continuously updated. The audio processing capability of such a sensor must also be greater than that for a single-microphone sensor, not only because it handles multiple audio channels, but also because high sampling rates are required to ensure adequate precision in time-of-arrival measurement at each microphone. Without sampling rates well above the threshold of human hearing, a directional sensor must be large enough that portability will be adversely affected, or else it will suffer from poor bearing accuracy. When the breadth of an array of directional sensors is small compared to the distance to the shooter, there can still be a great deal of error in the resulting range estimates due once again to the near-parallel bearings.

One means of obtaining a better range estimate, assuming a sensor is under fire or near the line of fire, is to use information from detected bullet shockwaves. A single high-frequency multi-microphone directional sensor can process acoustic shockwave arrival data to reconstruct the shape, duration, and intensity of the shockwave as it passes the sensor. By combining this reconstruction with models of ballistics and shockwave propagation, the bullet caliber and trajectory can be estimated. The caliber can then be used to select a model of the bullet's external ballistics, which leads to a good estimate of bearing and range. This estimate can be further improved if combined with the arrival time and direction of the following muzzle blast, when available.

FIG. 1 shows the bullet-shockwave and muzzle-blast phenomena. As the bullet initially leaves the barrel, a muzzle blast is created by the rapidly expanding gases behind it. This blast, shown as a circular dot-dashed curve, expands outward from the muzzle at the speed of sound. As it passes each sensor, it is detected as an impulse. Meanwhile, as the bullet travels ahead of the muzzle blast at supersonic speed, it produces a shockwave that expands outward from the bullet path at the speed of sound. The direction of the expanding shockwave at any point along its leading edge is determined by the bullet's Mach number at the instant that portion of the wave was created. If the bullet passes near a sensor while still supersonic, the sensor detects the shockwave as a very sharp impulse.

There have been a number of important recent advances in the ability to cheaply and accurately locate portable devices. Some of these include the widespread availability of GPS, compact INS units, and various means of photogrammetry. These advances have been accompanied by the proliferation of small, mobile computing devices such as those in notebook or tablet computers and cell phones. Many such devices incorporate microphones and wireless communication capabilities along with general-purpose computers capable of altering and enhancing their function through the use of installable software. Such mobile devices running appropriate software could be harnessed as part of a gunshot detection system.

An exemplary implementation of such a system might consist of a group of three or more soldiers, outfitted with these devices, which we'll call sensors, taking fire from an unknown sniper position as shown in FIG. 1. Standard tactics in a combat situation would require separation between individual soldiers on the order of ten meters. The relative sensor locations could easily be known to accuracy on the order of centimeters or decimeters using various technologies. Each sensor would have at least one general-purpose microphone capable of detecting impulsive events such as bullet shockwaves or muzzle blasts. Those skilled in the art would recognize that in such a situation, multilateration using detected muzzle-blast impulse arrival times would result in very low range accuracy. This is due to the source being well outside the array in combination with a high ratio of sensor position error to array size. Similarly, attempts to use the bullet-shock impulse arrival times to reconstruct the shape of the shockwave would at best be cumbersome and at worst be inaccurate. This is because the relative positions of the microphones are imprecisely known (e.g., known only to a precision which is a substantial portion of the inter-sensor distances, etc.), as they usually are in such an application, and also because the large separation between sensors prevents use of an assumption that all detected shocks are created by a constant-speed bullet.

As such, among other drawbacks overcome via the innovations herein, there is a need in such circumstances for systems and methods of processing the arrival times of both the projectile shock and the muzzle impulse to obtain an optimal solution of azimuth, elevation, and/or range.

BRIEF DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION OF EXEMPLARY IMPLEMENTATIONS

Figure 1:
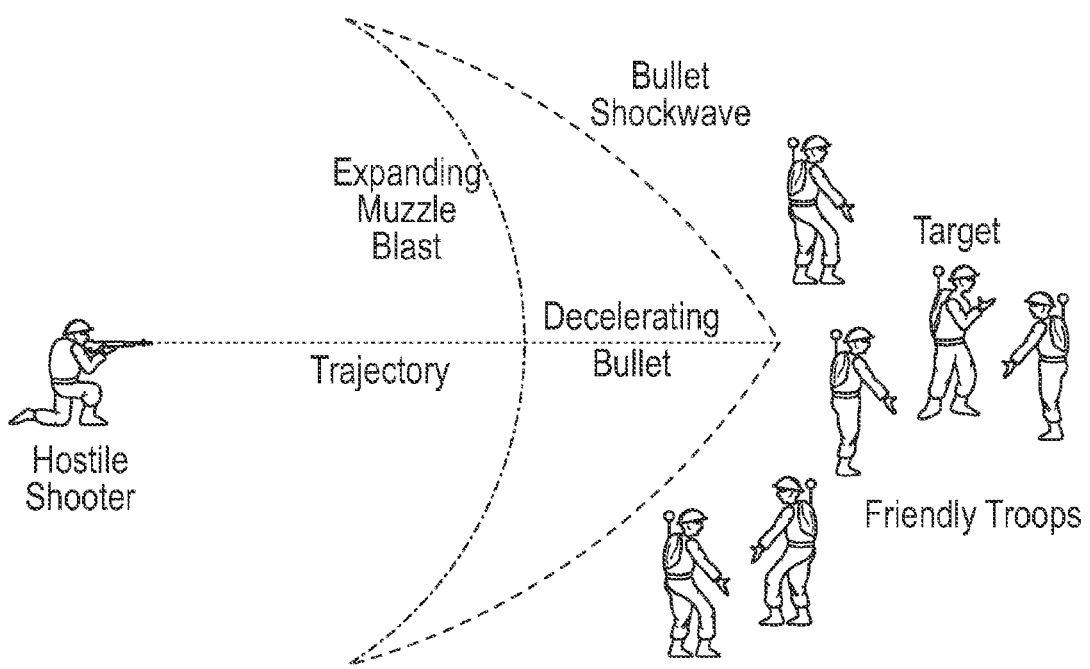
FIG. 1 is a diagram showing a basic muzzle blast wave and a basic shockwave of a bullet.

Reference will now be made in detail to the invention, examples of which are being illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

The innovations herein provide a means to determine weapon fire information, such as shooter location and/or shot direction, by combining bullet-impulse and muzzle-impulse time-of-arrival data from an array of sensors. Aspects of the innovations are useful for determining such information in conditions where weapon fire is occurring from beyond the limits of the array. Further, in certain implementations, at least some of the sensors may be individually mobile. Moreover, each sensor may have only a single microphone, though some implementations herein are useful for sensors with multiple microphones that may be temporarily or permanently incapable of providing an absolute vector in the direction of detected impulses.

In one illustrative implementation, for example, there is provided a method of transforming bullet shockwave and muzzle pulse arrival times at several sensors in an array under fire into an estimate of the shooter location. First, the known sensor locations and muzzle-pulse arrival times are processed to directly estimate the bearing (and optional elevation) of the shooter from the array centroid. This vector may then, optionally, be refined using an iterative optimization. Once the vector has been accurately estimated, a one-dimensional search (ODS) of ranges along the bearing is used to find a range and bullet path that produces an optimal match for the delays between the bullet-shockwave and muzzle-blast arrival times at each sensor. To do this, the bullet path is optimized at each tested range to match the delays, and the quantified consistency of the estimated range and path (with the measured time delays) provides the objective function for the ODS. In the absence of a known weapon type, the ODS is optionally conducted once for each of a number of prospective weapon types, such that the weapon type with the lowest overall objective-function value is the ultimate solution. A significant part of this process is the conversion of the range estimate and time delay for each sensor into a predicted miss angle, which can be directly compared to the miss angle resulting from a candidate bullet path.

Although it would be expected that improved accuracy of estimated sensor location would result in better solution accuracy, for a level of basic functional reliability, some such methods should not require better than a specified error in relative sensor positioning, such as about 1% in some implementations. Some solutions herein also do not require an impulse timing resolution better than that provided by an audio system designed primarily for processing human speech. Nor do various present systems/methods require more than one microphone per sensor. Further, in implementations having the potential for large sensor separations, solutions herein do not erroneously assume that the projectile maintains a constant velocity as it passes through or near the sensor array. Further, in implementations associated with noisy environment, such as in hostile situations, some present systems and methods may rapidly processing large numbers of pulse combinations and either eliminating them as physically mismatched or ranking their likelihood of producing a correct solution on the basis of a comparable measure of self consistency. Further, various implementations herein may be capable of doing this for a number of different prospective supersonic weapon types, with some also identifying the most likely on the basis of the self consistency of the resulting solutions.

Consistent with aspects of the present inventions, a location method that uses only the arrival times of the bullet shockwave and muzzle blast at three or more single-microphone sensors may be achieved. Further, the sensors may be individually mobile, as long as the position of each can be determined, such as at a level of accuracy typical of a handheld military GPS unit. As such, sensors consistent with the innovations herein may be significantly cheaper, smaller, and more survivable in combat situations than more complex directional sensors. The present disclosure enables formation of an effective array using separations as small as those normally associated with troop separation in hostile areas (~10 m). Further, innovations herein provide good results when the array aperture is small compared to the distance to the shooter. For example, a typical scenario might expose a shooter at 300 m to a 4-man military fire team with a width of as little as 30 m as observed from the shooter's point of view.

Further, each sensor consistent with aspects of the innovations herein may have only a single microphone or multiple microphones which may be temporarily or permanently incapable of providing an absolute vector in the direction of detected impulses. This may obviate the need to have sensors of greater complexity, higher cost, and/or greater demand for processing resources/bandwidth.

In implementations where three or more sensors detect muzzle pulses but only one or two of them detect bullet pulses, an estimate of bearing (and optionally elevation) and minimum shooter range can be produced.

In implementations where three or more sensors detect muzzle pulses but none of them detect bullet pulses, a bearing-only estimate can be produced using the linearized method.

Various algorithms herein assume that arrival times of bullet and muzzle pulses for multiple sensors will be provided as inputs. Some may also assume that for any particular execution of the bullet-related algorithms, the type of round is known or assumed, and that the initial velocity ($v_0$) and decay coefficient (k) are available for the round. These values can be obtained by curve-fitting the below functions to measured ballistics data. If the round or weapon type is unknown, multiple weapon types may be tried, with the optimal round being selected based on the ultimate values of the shot-direction objective function, and optionally the shooter-vector self consistency. The following equations represent a bullet model employed in an exemplary implementation:

$$\frac{dv}{dt} = -kv^2 \quad \text{Decaying-velocity model.} \quad 1$$

$$v = \frac{4}{\left(kt + \frac{2}{\sqrt{v_o}}\right)^2} \quad \text{Integrate (1) and apply boundary condition } v(t=0) = v_o. \quad 2$$

$$x = \frac{2\sqrt{v_o}}{k} - \frac{4}{k^2 t + \frac{2k}{\sqrt{v_o}}} \quad \text{Integrate (2) and apply boundary condition } x(t=0) = 0. \quad 3$$

$$t = \frac{2x}{2v_o - k\sqrt{v_o}\, x} \quad \text{Invert (3) and solve for t.} \quad 4$$

Equation (2) represents the bullet velocity (v) as a function of time of flight (t).
Equation (3) provides the distance traveled (x), also as a function of time of flight.
Equation (4) provides the time of flight required for the bullet to travel a given distance.

Figure 2:
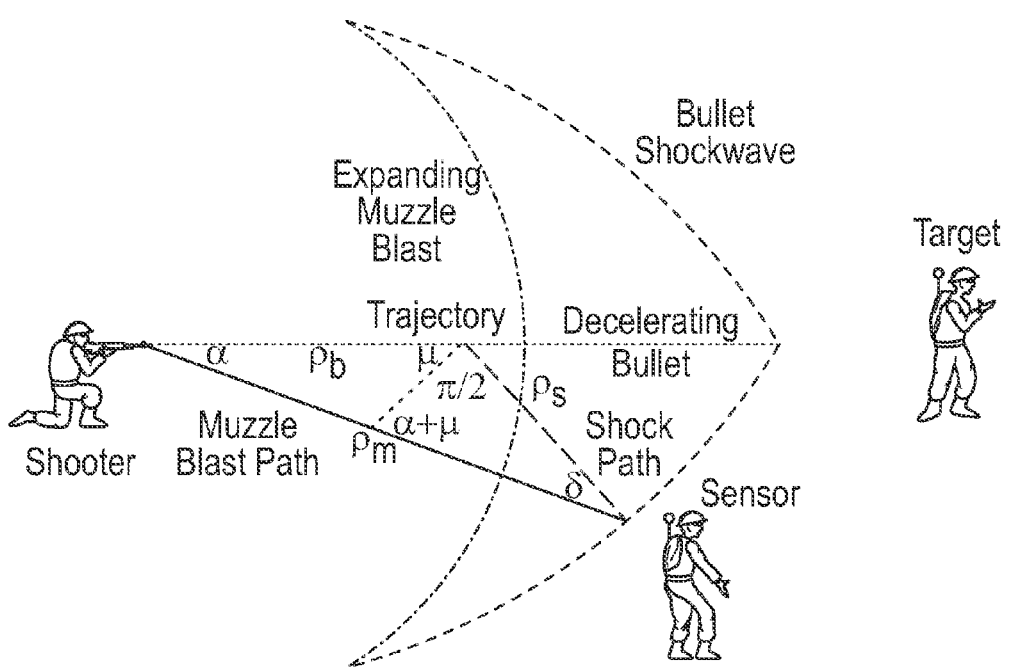
FIG. 2 is a diagram of exemplary bullet geometries, consistent with certain aspects related to the innovations herein.

Turning to FIG. 2, geometric relationships between several parameters involved in the creation and transmission of the bullet and muzzle pulses received by a sensor are illustrated, consistent with aspects of the innovations herein. The diagram represents the paths of the bullet and muzzle impulses to one sensor in an array. The following symbols are used:

α is the miss angle between the bullet path (dotted line) and the (thick solid) line from the shooter to the sensor.

δ is the angular difference between the bullet (thick dashed line) and muzzle (thick solid line) pulse arrival vectors at the sensor.

$\rho_m$ is the distance from the shooter to the sensor.

$\rho_b$ is the distance traveled by the bullet at the time that its shock wave is perpendicular to the path from the bullet to the sensor.

μ is the Mach angle of the bullet shock wave. Note that the light dashed line in the figure represents the orientation of the shock wave front at its creation. The heavy dashed line is its direction of travel to reach the sensor. The curved dashed line represents the shock wave front at the time it passes the sensor.

$\rho_s$ is the distance traveled by the bullet shock from its creation point to the sensor.

There are several steps to the solution process as illustrated in the following figures. The first two examples assume that bullet and muzzle impulses cannot be reliably differentiated prior to this process. Systems and methods herein are not limited to that situation, however. When bullet and muzzle impulses can be differentiated prior to this process, the pulses participating in each step can be reduced only to those of the appropriate type. Of course the relative timing requirements still apply (e.g. the bullet impulse must precede the muzzle impulse on any particular sensor).

Figure 3:
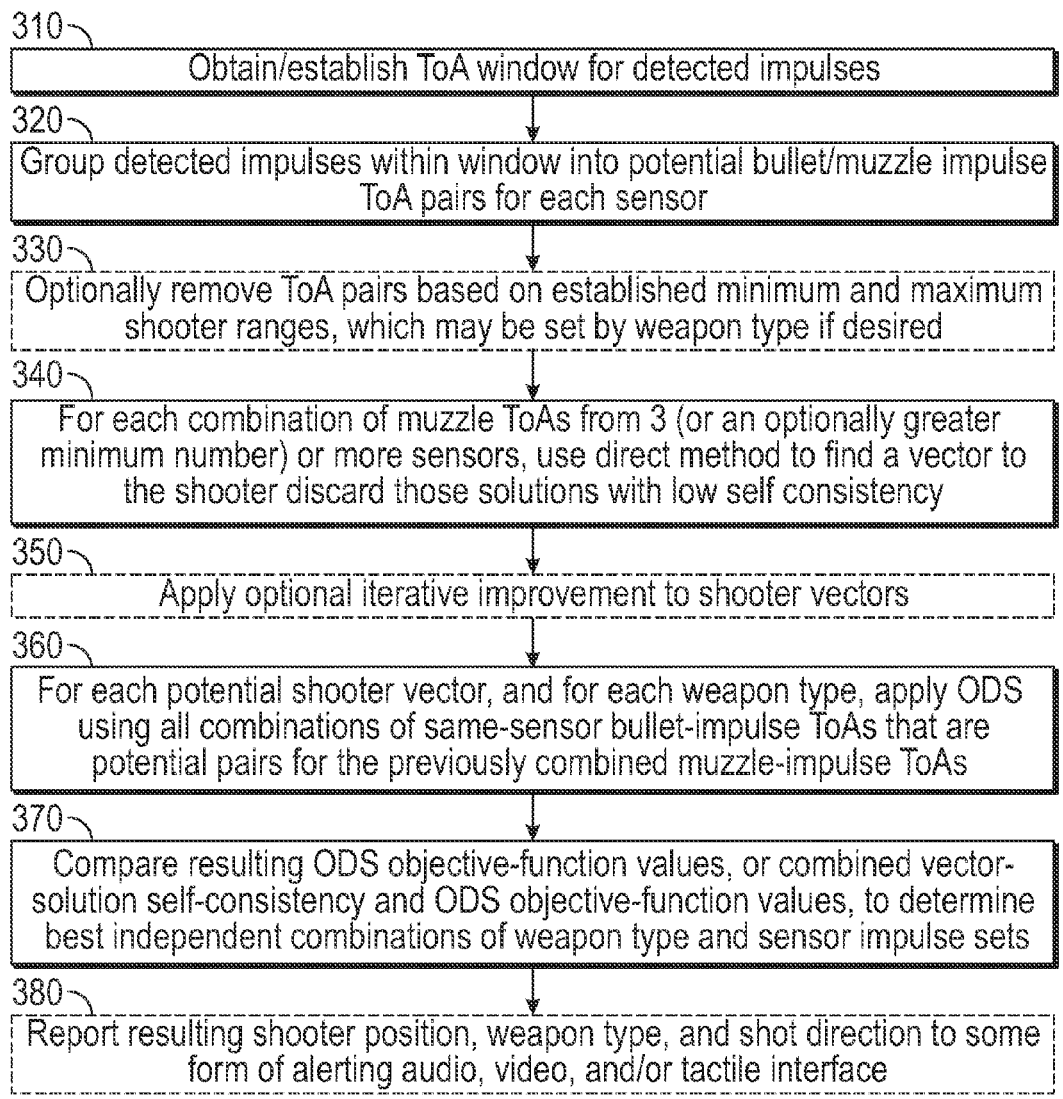
FIG. 3 is a flow diagram illustrating an exemplary process in which bullet and muzzle impulses are paired by sensor, consistent with certain aspects related to the innovations herein.

FIG. 3 is a flow diagram illustrating an exemplary process in which bullet and muzzle impulses are paired by sensor, consistent with certain aspects related to the innovations herein. FIG. 3 shows an exemplary implementation in which only sensors that receive both bullet and muzzle impulses participate. As initial steps to such illustrative process, time of arrival (ToA) windows may be obtained/established for detected impulses 310, and the detected impulses within such windows may be grouped into potential bullet/muzzle impulse ToA pairs for each sensor 320. Next, the process may proceed to an optional step of removing ToA pairs based on minimum and/or maximum shooter ranges, at 330. Here, for example, ToA pairs may be removed as a function of minimum or maximum ranges set by weapon type or by other physical data, such as known information regarding the shooter, ammunition, and/or environment. Then, for each combination of muzzle ToA's from 3 (or an optionally greater minimum number) or more sensors, determination of a vector to the shooter may be calculated such as via a direct method. Also here, at 340, solutions with low self consistency may be discarded. In another optional step, at 350, processes to improve vectors to the shooter may be performed, such as iterative processes. At 360, for each potential shooter vector, and for each weapon type, one dimensional searching ("ODS") may be applied using multiple or all combinations of same-sensor bullet-impulse ToAs that are potential pairs for the previously combined muzzle-impulse ToAs. Further, at 370, resulting ODS objective-function values (or combined vector-solution self-consistency and ODS objective-function values) may be compared to determine best independent combinations of weapon type and sensor impulse sets. Lastly, in another optional step at 380, weapon fire information such as resulting shooter position, weapon type and/or shot direction may be reported. Here, for example, such information may be reported to or prepared for report to some form of alerting audio, video and/or tactile interface.

With regard to systems and methods consistent with FIG. 3 and other implementations herein, in live-fire tests on a simulated squad wedge formation, with commercially available GPS locators determining sensor positions, successful results were achieved using this implementation with both AK-47 and M-16 fire from a range of 250 m. Using unmodified GPS output, 78.3% of shots were located with less than 15° error in bearing, and 63.0% were located with less than 20% error in range. Here, however, a primary impediment to achieving accuracy was found to be the accuracy of the GPS units, particularly in elevation. As such, using enhanced or augmented GPS locators yields even better results. Indeed, as established by manual application of approximate corrections to known errors in the GPS positions, 95.7% of the same shots were located within 15° of bearing error and 92.4% within 20% of range error.

Figure 4:
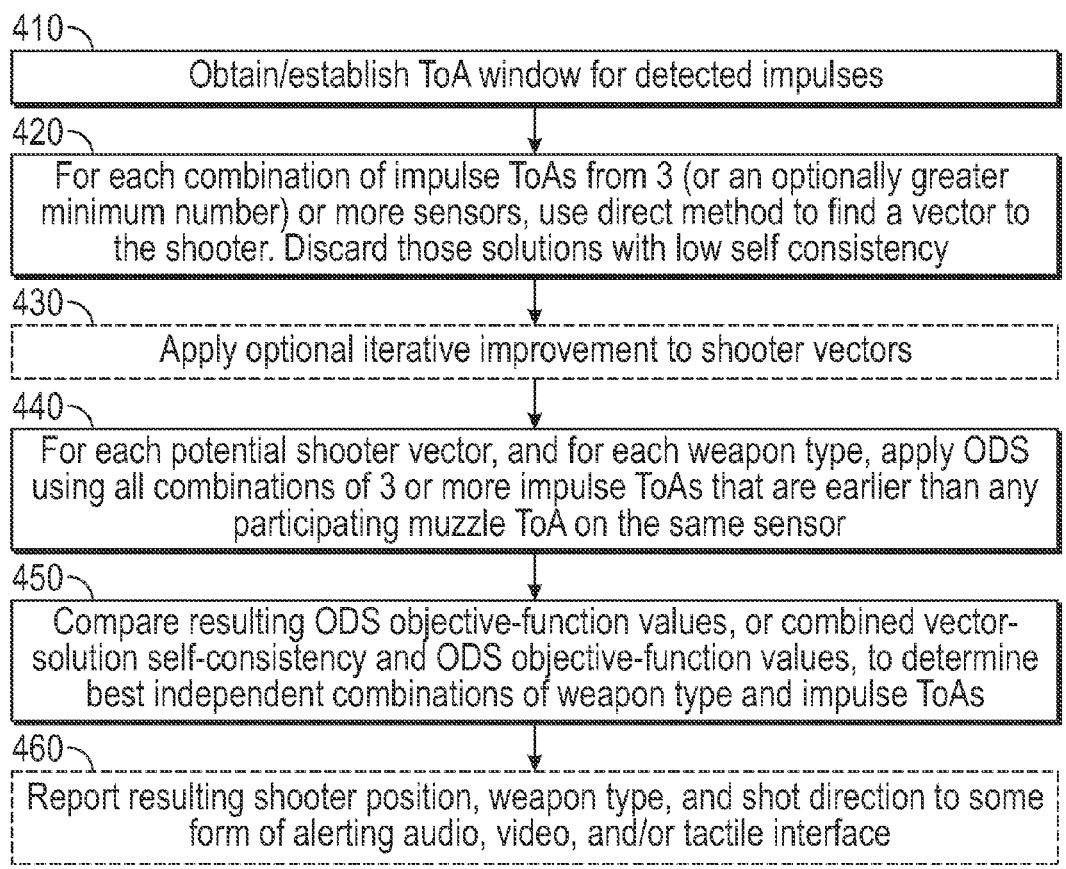
FIG. 4 is a flow diagram illustrating an exemplary process in which one or more sensors may provide only muzzle impulse(s), consistent with certain aspects related to the innovations herein.

FIG. 4 is a flow diagram illustrating an exemplary process in which one or more sensors may provide only muzzle impulse(s), consistent with certain aspects related to the innovations herein. FIG. 4 details an exemplary implementation in which each sensor may report only a muzzle impulse or both a bullet impulse and a muzzle impulse. The illustrative implementation of FIG. 4 shows three initial steps (one optional), at 410, 420 and 430, which are consistent with comparable steps shown at 310, 340 and 350 of FIG. 3.

At 440, for each potential shooter vector, and for each weapon type, one dimensional searching ("ODS") may be applied using multiple or all combinations of 3 or more impulse ToAs that are earlier than any participating muzzle ToA on the same sensor. Further, at 450, resulting ODS objective-function values (or combined vector-solution self-consistency and ODS objective-function values) may be compared to determine best independent combinations of weapon type and impulse ToAs. Lastly, in another optional step at 460, weapon fire information such as resulting shooter position, weapon type and/or shot direction may be reported. Here, for example, such information may be reported to or prepared for report to some form of alerting audio, video and/or tactile interface.

Figure 5:
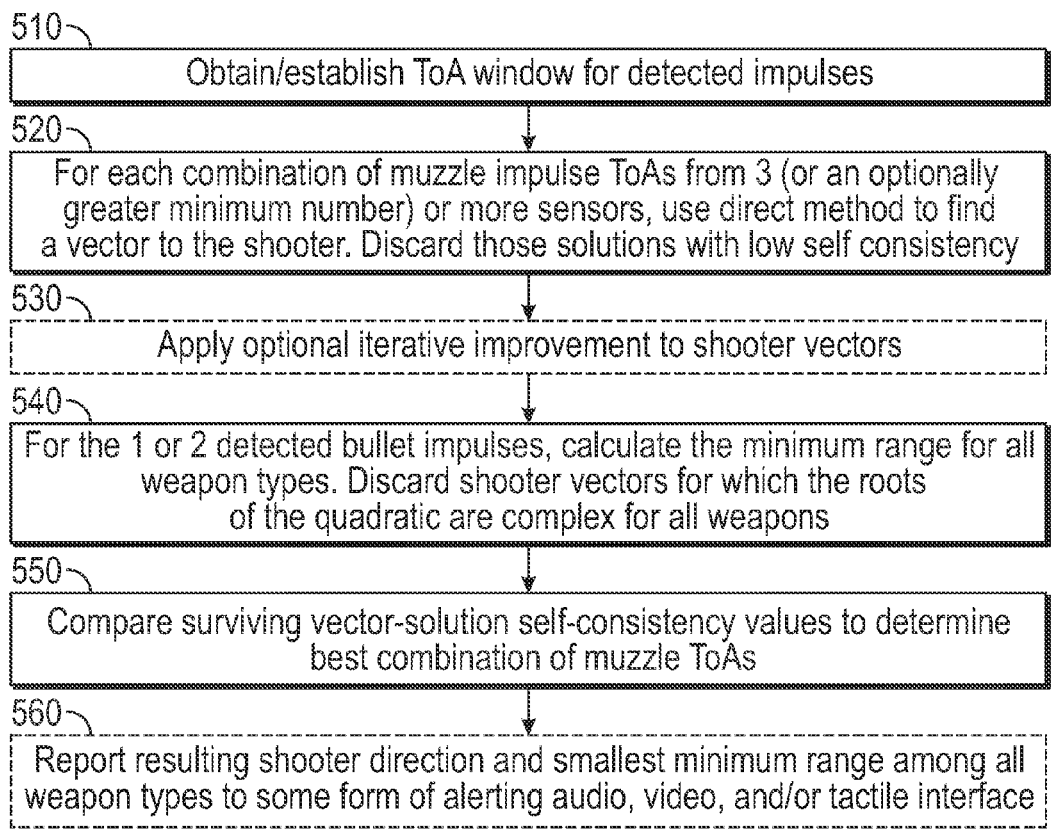
FIG. 5 is a flow diagram illustrating an exemplary process with bullet/muzzle differentiation with fewer than 3 sensors reporting a bullet impulse, consistent with certain aspects related to the innovations herein.

FIG. 5 is a flow diagram illustrating an exemplary process with bullet/muzzle differentiation with fewer than 3 sensors reporting a bullet impulse, consistent with certain aspects related to the innovations herein. FIG. 5 details an exemplary implementation in which bullet and muzzle impulses have been reliably differentiated but fewer than three sensors report a bullet impulse. The illustrative implementation of FIG. 5 shows three initial steps (one optional), at 510, 520 and 530, which are consistent with comparable steps shown in FIGS. 3 and 4. At 540, for detected bullet impulses (e.g., a subset, like 1 or 2), calculation may then be performed to yield the minimum range for all weapon types. Further, here, shooter vectors for which the roots of the quadratic are complex for all weapons may be discarded. Further, at 550, surviving vector-solution self-consistency values may be compared to determine best combination of muzzle impulse ToAs. Lastly, in another optional step at 560, weapon fire information such as resulting shooter position, weapon type and/or shot direction may be reported. Here, for example, such information may be reported to or prepared for report to some form of alerting audio, video and/or tactile interface.

Illustrative/Exemplary Algorithms

The following sections outline illustrative algorithms used in various systems and methods herein.

1. Sensor-to-Shooter Range Linearization

All the algorithms used herein for determining shooter bearing and range, as well as shot (aim) direction, require frequent calculation of the distance $R(X_i - X_s)$ between an estimated shooter position $[x_s y_s z_s]^T$ and each of the known sensor locations $[x_i y_i z_i]^T$.

| | | |
|---|---|---|
| $R(X_i - X_s) = \sqrt{(x_i-x_s)^2+(y_i-y_s)^2+(z_i-z_s)^2}$ | Euclidean distance between 2 points. | 5 |

This expression appears within the objective function of the primary TDOA problem, as well as within many equations derived from FIG. 2 for use in range computation. The complexity of the expression not only requires consumption of a large number of clock cycles (when repeated many times); it also prohibits treatment of certain problems using linear algebra. For situations in which the distance from the shooter to the sensor-array centroid is significantly greater than the distance from each sensor to the centroid, we can linearize the expression in the following manner.

| | | |
|---|---|---|
| $X = [x\ y\ z]^T$ | Generic vector X. | 6 |
| $R \cong \|X\| = (x^2 + y^2 + z^2)^{1/2}$ | Vector length. | 7 |
| $R(X) \cong R(X_0) + \nabla R_{X_0} \cdot (X - X_0)$ | General multivariate linear approximation using first two terms of Taylor expansion. The value of X is assumed to be near $X_O$. | 8 |
| $X_c \cong [x_s\ y_s\ z_s]^T$ | Shooter location. | 9 |
| $X_i \cong [x_i\ y_i\ z_i]^T$ | Sensor location. | 10 |
| $X_c \cong \frac{1}{n}\sum_{i=0}^{n-1} X_i$ | Centroid of sensor array. | 11 |
| $\nabla R_x \cong \frac{dR}{dX} = \left[\frac{\partial R}{\partial x}\ \frac{\partial R}{\partial y}\ \frac{\partial R}{\partial z}\right]^T$ | Gradient definition. | 12 |
| $\frac{\partial R}{\partial x} = \frac{x}{R}$ | Partial derivative of (7) wrt x. Derivatives wrt y and z are similar. | 13 |
| $\nabla R_x = \frac{1}{R}[x\ y\ z]^T = \frac{1}{R}X$ | Substitution (12, 13). | 14 |
| $R(X_i - X_s) \cong R(X_c - X_s) + \nabla R_{X_c-X_s} \cdot (X_i - X_c)$ | Approximation of $R(X_i - X_g)$ linearized about $X_c - X_s$, from (8). | 15 |
| $R_c \cong R(X_c - X_s)$ | This value will be a constant for a given shooter radius and set of fixed (even if only for a specific incident) sensors. | 16 |
| $\nabla R_{X_c-X_s} = \frac{1}{R_c}(X_c - X_s)$ | Substitution (14, 16). | 17 |
| $R_i \cong R_c + \frac{1}{R_c}(X_c - X_s) \cdot (X_i - X_c)$ | Define $R_i$ to be the approximation in (15), with substitution from (16, 17). | 18 |
| $\overline{X}_i \cong X_i - X_c$ | This gets us a set of small vectors representing the positions of the sensors relative to the array centroid. | 19 |
| $\overline{X}_s \cong X_s -\!\!+ X_c$ | This is the position of the shooter relative to the array centroid. | 20 |
| $R_i = R_c - \frac{1}{R_c}\overline{X}_s^T \overline{X}_i$ | Substitution (18, 19, 20). | 21 |
| $R_i = R_c - \frac{1}{R_c}\overline{X}_i^T \overline{X}_s$ | Transpose the scalar result of the dot product. | 22 |

Now, in equation (22), we have a linear expression for sensor-to-shooter range.

2. Direct Determination of Bearing and Optional Elevation from Sensor Array to Shooter We'll put the new range expression to work right away in this section.

| | | |
|---|---|---|
| $F \cong \sum_{i=0}^{n-1} (R_i - V_s(t_i - t_s))^2$ | This is our objective function for the TDOA problem. We want to minimize the sum of the squares. $V_s$ is the speed of sound. | 23 |
| $t_c \cong t_s + \frac{R_c}{V_s}$ | $t_c$ is the time that the muzzle pulse arrives at the array centroid. | 24 |

| Equation | Description | # |
|---|---|---|
| $t_s = t_c - \dfrac{R_c}{V_s}$ | Rearrangement of (24). | 25 |
| $t_c = \dfrac{1}{n}\sum_{i=0}^{n-1} t_i$ | $t_c$ is also equal to the average of the muzzle arrival times at the sensors. We'll use this expression to calculate it when we eventually solve for the shot time. | 26 |
| $F = \sum_{i=0}^{n-1}\left(R_c - \dfrac{1}{R_c}X_i^T \overline{X}_s - V_s\left(t_i - t_c + \dfrac{R_c}{V_s}\right)\right)^2$ | Substitution (22, 23, 25). | 27 |
| $F = \sum_{i=0}^{n-1}\left(-\dfrac{1}{R_c}(\overline{x}_i\overline{x}_s + \overline{y}_i\overline{y}_s + \overline{z}_i\overline{z}_s) - V_s(t_i - t_c)\right)^2$ | Reduction. | 28 |
| $\dfrac{\partial F}{\partial \overline{x}_s} = -\dfrac{2}{R_c}\sum_{i=0}^{n-1}\overline{x}_i(\overline{x}_i\overline{x}_s + \overline{y}_i\overline{y}_s + \overline{z}_i\overline{z}_s + R_c V_s(t_i - t_c))$ | Partial derivative of (28) wrt $\overline{x}_s$. Derivatives wrt $\overline{y}_s$ and $\overline{z}_s$ are similar. | 29 |
| $\dfrac{dF}{dX_s} = -\dfrac{2}{R_c}\sum_{i=0}^{n-1}\left(\begin{bmatrix}\overline{x}_i^2 & \overline{x}_i\overline{y}_i & \overline{x}_i\overline{z}_i \\ \overline{x}_i\overline{y}_i & \overline{y}_i^2 & \overline{y}_i\overline{z}_i \\ \overline{x}_i\overline{z}_i & \overline{y}_i\overline{z}_i & \overline{z}_i^2\end{bmatrix}\overline{X}_s + R_c V_s(t_i - t_c)\overline{X}_i\right)$ | Full gradient of TDoA objective function in three dimensions. | 30 |
| $\hat{X}_s \cong \dfrac{\overline{X}_s}{|\overline{X}_s|} = \dfrac{\overline{X}_s}{R_c}$ | Define a unit vector based on $\overline{X}_s$. | 31 |
| $\dfrac{dF}{d\overline{X}_s} = -2\sum_{i=0}^{n-1}\left(\begin{bmatrix}\overline{x}_i^2 & \overline{x}_i\overline{y}_i & \overline{x}_i\overline{z}_i \\ \overline{x}_i\overline{y}_i & \overline{y}_i^2 & \overline{y}_i\overline{z}_i \\ \overline{x}_i\overline{z}_i & \overline{y}_i\overline{z}_i & \overline{z}_i^2\end{bmatrix}\hat{X}_s + V_s(t_i - t_c)\overline{X}_i\right)$ | Substitution (30, 31) and simplification. | 32 |
| $\dfrac{dF}{d\overline{X}_s} = -2\sum_{i=0}^{n-1}\begin{bmatrix}\overline{x}_i^2 & \overline{x}_i\overline{y}_i & \overline{x}_i\overline{z}_i \\ \overline{x}_i\overline{y}_i & \overline{y}_i^2 & \overline{y}_i\overline{z}_i \\ \overline{x}_i\overline{z}_i & \overline{y}_i\overline{z}_i & \overline{z}_i^2\end{bmatrix}\hat{X}_s - 2V_s\sum_{i=0}^{n-1}(t_i - t_c)\overline{X}_i$ | Distributive property. | 33 |
| $\dfrac{dF}{d\overline{X}_s} = -2\sum_{i=0}^{n-1}\begin{bmatrix}\overline{x}_i^2 & \overline{x}_i\overline{y}_i & \overline{x}_i\overline{z}_i \\ \overline{x}_i\overline{y}_i & \overline{y}_i^2 & \overline{y}_i\overline{z}_i \\ \overline{x}_i\overline{z}_i & \overline{y}_i\overline{z}_i & \overline{z}_i^2\end{bmatrix}\hat{X}_s - 2V_s\sum_{i=0}^{n-1}t_i\overline{X}_i + 2V_s t_c\sum_{i=0}^{n-1}\overline{X}_i$ | Distributive property. | 34 |
| $\sum_{i=0}^{n-1}\overline{X}_i = \sum_{i=0}^{n-1}(X_i - X_c) = \sum_{i=0}^{n-1}X_i - n\dfrac{1}{n}\sum_{i=0}^{n-1}X_i = 0$ | Substitution (11, 19). | 35 |
| $\dfrac{dF}{d\overline{X}_s} = -2\sum_{i=0}^{n-1}\begin{bmatrix}\overline{x}_i^2 & \overline{x}_i\overline{y}_i & \overline{x}_i\overline{z}_i \\ \overline{x}_i\overline{y}_i & \overline{y}_i^2 & \overline{y}_i\overline{z}_i \\ \overline{x}_i\overline{z}_i & \overline{y}_i\overline{z}_i & \overline{z}_i^2\end{bmatrix}\hat{X}_s - 2V_s\sum_{i=0}^{n-1}t_i\overline{X}_i$ | Substitution (34, 35). | 36 |
| $-2\sum_{i=0}^{n-1}\begin{bmatrix}\overline{x}_i^2 & \overline{x}_i\overline{y}_i & \overline{x}_i\overline{z}_i \\ \overline{x}_i\overline{y}_i & \overline{y}_i^2 & \overline{y}_i\overline{z}_i \\ \overline{x}_i\overline{z}_i & \overline{y}_i\overline{z}_i & \overline{z}_i^2\end{bmatrix}\hat{X}_s - 2V_s\sum_{i=0}^{n-1}t_i\overline{X}_i \triangleq \begin{bmatrix}0\\0\\0\end{bmatrix}$ | Set all partial derivatives to zero to find optimum. | 37 |
| $\sum_{i=0}^{n-1}\begin{bmatrix}\overline{x}_i^2 & \overline{x}_i\overline{y}_i & \overline{x}_i\overline{z}_i \\ \overline{x}_i\overline{y}_i & \overline{y}_i^2 & \overline{y}_i\overline{z}_i \\ \overline{x}_i\overline{z}_i & \overline{y}_i\overline{z}_i & \overline{z}_i^2\end{bmatrix}\hat{X}_s = -V_s\sum_{i=0}^{n-1}t_i\overline{X}_i$ | Rearranging. Note that because of (35), any constant can be added to $t_i$ without changing the sum on the right side of the equation. | 38 |

Using either a pseudo-inverse or a linear-solve routine, the final linear equation (38) can be solved for $\hat{X}_s$ to find the best shooter bearing, relative to the array centroid, for the assumed range. Note that contributions to $\overline{z}_i$ from vertical GPS errors may exceed contributions due to actual sensor distribution. In such cases, the third column and row can be omitted. The solution vector will then be a 2-D vector. To constrain the solution to a horizontal plane without ignoring sensor vertical locations, simply set the third column values of the matrix to zero. In all cases, the length of the resulting vector $\overline{X}_s$, can be compared to unity to obtain a measure of consistency of the solution.

3. Determination of Range from Sensor Array to Shooter

Systems and methods herein may use the bullet-pulse arrival data to solve for the best range on the previously obtained vector. In some implementations, for example, this may be performed using a one-dimensional search of ranges along the vector. This may involve an objective function that measures the fit of each attempted range value against our bullet model (as represented by FIG. 2, and equations (1)-(5)) and the pulse arrival data.

If, at a given range, the miss angle $\alpha_i$ needed to satisfy the time delay between the bullet pulse and muzzle pulse for each sensor may be obtained/determined, then the bullet trajectory can be found that best matches all the miss angles. Miss angle $\alpha_i$ is discussed in the next section. Assume $\mu_i$ is the vector from the shooter to one of the sensors, and $\overline{d}$ is a unit vector representing the direction of the bullet's track.

| | | |
|---|---|---|
| $u_i \cong X_i - X_s$ | Problem statement. | 39 |
| $\|\overline{d}\| \cong 1$ | Problem statement. | 40 |
| $u_i \cdot \overline{d} = \|u_i\|\|d\|\cos\alpha_i$ | Euclidean interpretation of dot product. | 41 |
| $(X_i - X_s) \cdot \overline{d} = \|X_i - X_s\|\cos\alpha_i$ | Substitution (39, 40, 41). | 42 |
| $(\overline{X}_i - \overline{X}_s) \cdot \overline{d} \cong R_i \cos\alpha_i$ | Substitution (15, 18, 19, 20, 42). | 43 |
| $(\overline{X}_i - \overline{X}_s) \cdot \overline{d} \cong \left(R_c - \frac{1}{R_c} X_i^T X_s\right) \cos\alpha_i$ | Substitution (22, 43). | 44 |
| $G \cong \sum_{i=0}^{n} \left(\|X_i - X_s\|\cos\alpha_i - (\overline{X}_i - \overline{X}_s) \cdot \frac{\overline{d}}{\|\overline{d}\|}\right)^2$ | Objective function defined. | 45 |

Either equation (42), which uses the exact range to each sensor, or equation (44), which uses the possibly quicker linearized range, may be solved for $\overline{d}$. The normalized result can be used to calculate residuals, providing a basis for the objective function defined in (45).

4. Calculation of Miss Angle at an Assumed Range

Refer again to FIG. 2. We introduce the following variables:

| | | |
|---|---|---|
| $\tau_\Delta$ | Measured difference in seconds between muzzle and bullet pulse arrival times. | 46 |
| $\tau_b$ | Bullet flight time in seconds at time of creation of the bullet pulse. | 47 |
| $\tau_m$ | Muzzle pulse travel time in seconds. | 48 |
| $\tau_s$ | Bullet shock travel time in seconds. | 49 |

For a given range $\rho_m$ and miss angle $\alpha$ there should be at most one bullet flight time $\tau_b$ that satisfies the geometry. Likewise, the resulting geometry should support exactly one $\tau_\Delta$. We need an equation in terms of the known values $\tau_\Delta$, $\rho_m$, k, $V_0$, and $V_s$, along with the unknown value $\tau_b$. If we can solve for $\tau_b$, we can use it to determine $\alpha$, or better yet, $\cos\alpha$, which is what we need for the preceding section.

| | | |
|---|---|---|
| $\rho_m^2 = \rho_b^2 + \rho_s^2 - 2\rho_b\rho_s \cos\left(\mu + \frac{\pi}{2}\right)$ | Law of cosines. (See FIG. 2.) | 50 |
| $\cos\left(\mu + \frac{\pi}{2}\right) = -\sin\mu$ | Identity. | 51 |
| $\mu = \sin^{-1}\left(\frac{V_s}{V_b}\right)$ | Definition of Mach angle. | 52 |
| $\cos\left(\mu + \frac{\pi}{2}\right) = -\frac{V_s}{V_b}$ | Substitution (51, 52). | 53 |
| $\rho_m^2 = \rho_b^2 + \rho_s^2 + 2\rho_b\rho_s \frac{V_s}{V_b}$ | Substitution (50, 53). | 54 |
| $\rho_b = \frac{2\sqrt{V_0}}{k} - \frac{4}{k^2\tau_b + \frac{2k}{\sqrt{V_0}}}$ | Equation (3) and FIG. 2. | 55 |
| $\rho_b = \frac{2\sqrt{V_0}}{k} - \frac{4}{\frac{k}{\sqrt{V_0}}(k\sqrt{V_0}\tau_b + 2)}$ | Distributive property. | 56 |
| $\rho_b = \frac{2(k\sqrt{V_0}\tau_b + 2) - 4}{\frac{k}{\sqrt{V_0}}(k\sqrt{V_0}\tau_b + 2)}$ | Rearranging. | 57 |
| $\rho_b = \frac{2V_0\tau_b}{k\sqrt{V_0}\tau_b + 2}$ | Simplification. | 58 |
| $Q \cong k\sqrt{V_0}$ | We'll use this constant to cut the clutter. | 59 |
| $\rho_b = \frac{2V_0\tau_b}{Q\tau_b + 2}$ | Substitution (58, 59). | 60 |
| $\rho_s = V_s\tau_s$ | Distance traveled by bullet shock in meters. | 61 |
| $\tau_\Delta = \tau_m - (\tau_{j_s} + \tau_s)$ | Definitions above (46-49). | 62 |
| $T \cong \tau_m - \tau_\Delta$ | Another clutter fighter. | 63 |
| $\tau_s = T - \tau_b$ | Substitution (62, 63). | 64 |
| $\rho_s = V_s(T - \tau_b)$ | Multiplication by $V_s$ and substitution (61, 64). | 65 |
| $V_b = \frac{4}{\left(k\tau_b + \frac{2}{\sqrt{V_0}}\right)^2}$ | Equation (2) and FIG. 2 | 66 |
| $V_b = \frac{4V_0}{\left(k\sqrt{V_0}\tau_b + 2\right)^2}$ | Multiplication of numerator and denominator by $V_O$. | 67 |
| $V_b = \frac{4V_0}{(Q\tau_b + 2)^2}$ | Substitution (59, 67). | 68 |
| $\rho_m^2 = \left(\frac{2V_0\tau_b}{Q\tau_b + 2}\right)^2 + V_s^2(T - \tau_b)^2 + 2\left(\frac{2V_0\tau_b}{Q\tau_b + 2}\right)V_s(T - \tau_b)\frac{V_s(Q\tau_b + 2)^2}{4V_0}$ | Substituion (54, 60, 65, 68). | 69 |
| $\rho_m^2 = \frac{4V_0^2\tau_b^2}{(Q\tau_b + 2)^2} + V_s^2(T - \tau_b)^2 + V_s^2(T - \tau_b)\tau_b(Q\tau_b + 2)$ | Simplification. | 70 |
| $\rho_m^2 = \frac{4V_0^2\tau_b}{(Q\tau_b + 2)^2} + V_s^2(T - \tau_b)(Q\tau_b^2 + \tau_b + T)$ | Simplification. | 71 |

| | | |
|---|---|---|
| $V_s^2(T-\tau_b)(Q\tau_b^2+\tau_b+T)(Q\tau_b+2)^Z + 4V_0^Z\tau_b^2 - \rho_m^Z(Q\tau_b+2)^Z = 0$ | Rearranging. | 72 |
| $(T-\tau_b)(Q\tau_b^2+\tau_b+T)(Q\tau_b+2)^2 +$ | Division by $V_s^Z$, which is done to reduce clutter in the final form of the expanded polynomial. | 73 |
| $4\left(\frac{V_0}{V_s}\right)^2\tau_b^2 - \left(\frac{\rho_m}{V_s}\right)^2(Q\tau_b+2)^2 = 0$ | | |
| $-Q^3\tau_b^5 + Q^2(QT-5)\tau_b^4 + 4Q(QT-2)\tau_b^3 +$ | Expansion. | 74 |
| $\left(Q^2\left(T^2-\left(\frac{\rho_m}{V_s}\right)^2\right)+4\left(QT+\left(\frac{V_0}{V_s}\right)^2-1\right)\right)\tau_b^2 +$ | | |
| $4Q\left(T^2-\left(\frac{\rho_m}{V_s}\right)^2\right)\tau_b + 4\left(T^2-\left(\frac{\rho_m}{V_s}\right)^2\right) = 0$ | | |
| $P \cong T^2 - \left(\frac{\rho_m}{V_s}\right)^2$ | More clutter fighting. | 75 |
| $f(\tau_b) \stackrel{def}{=} -Q^3\tau_b^5 + Q^2(QT-5)\tau_b^4 +$ $4Q(QT-2)\tau_b^3 + \left(Q^2P + 4\left(QT + \left(\frac{V_0}{V_s}\right)^2 - 1\right)\right)\tau_b^2 + 4QP\tau_b + 4P = 0$ | Substitution (74, 75). | 76 |

Now we have a 5$^{th}$-degree polynomial for which we determination of a root is in order. Here, the smallest positive real root is desired, because we know that the bullet flight time must be greater than zero, and it would not make physical sense for there to be a wrong solution between zero and the correct one. At this point, the method allows the use of any applicable root-finding algorithm. In one exemplary case, since we know the vicinity of the root, we can use Newton's method to converge on it from a nearby guess. We'll ignore $\tau_\Delta$ for the moment and compute the maximum possible value of $\tau_b$ if the bullet were fired directly at the sensor ($\alpha=0$). We'll take half that value as our initial guess.

| | | |
|---|---|---|
| $\rho_m = \frac{2V_0\tau_{b_{max}}}{Q\tau_{b_{max}}+2}$ | Equation (60) with $\rho$ substituted for $\rho_b$ at $\tau_b=\tau_{b_{max}}$. | 77 |
| $\rho_m Q\tau_{b_{max}} + 2\rho_m = 2V_0\tau_{b_{max}}$ | Multiplication. | 78 |
| $\tau_{b_{max}} = \frac{2\rho_m}{2V_0 - \rho_m Q}$ | Rearranging. | 79 |
| $\tau_{b_0} = \frac{\rho_m}{2V_0 - \rho_m Q}$ | Division by 2 to get initial estimate. | 80 |
| $\tau_{b_{n+1}} = \tau_{b_n} - \frac{f(\tau_{b_n})}{f'(\tau_{b_n})}$ | Newton's method. | 81 |

Once the coefficients of the polynomial in equation (76) have been computed, the coefficients of the first derivative are easily obtained.

| | | |
|---|---|---|
| $C'_j = (j+1)C_{j+1}$ | Coefficients of the derivative of a polynomial. | 82 |

Computing the correction is then performed. The process typically takes three or four iterations on simulated data to arrive at a suitably precise value. A prudent implementation will place a limit on the number of iterations to prevent a divergent runaway; ten iterations should be more than enough in any case. Now the cosine of the miss angle may be determined.

| | | |
|---|---|---|
| $\rho_s^Z = \rho_b^Z + \rho_m^Z - 2\rho_b\rho_m\cos\alpha$ | Law of cosines. (See FIG. 2.) | 83 |
| $\cos\alpha = \frac{\rho_b^2 + \rho_m^2 - \rho_s^2}{2\rho_b\rho_m}$ | Rearranging. | 84 |

Equations (22, 60, 65, 84) provide everything we need to arrive at cos $\alpha$, substituting $R_i$ for $\rho_m$.

5. Finding a Minimum Range Estimate

As is the case with $\tau_b$, the maximum value of $\tau_\Delta$ available at a given range would occur when a is zero. Firing directly at the sensor ensures that the bullet pulse arrives as early as possible, without affecting the arrival time of the muzzle pulse (ignoring any potential increase in sound speed in the heated air of the bullet's wake). Any reduction in range at zero miss angle would decrease the bullet travel time less than it decreased the muzzle travel time, thus resulting in a decrease in the maximum value of $\tau_\Delta$. We can therefore assume that the minimum possible range for a given $\tau_\Delta$ happens at the zero miss angle. If we calculate this minimum range for each sensor, we can determine the overall minimum range at which to begin computing the objective function of equation (45). We can then work outward from that point.

| | | |
|---|---|---|
| $\tau_{b_{max}} \cong \tau_m - \tau_\Delta$ | This comes from settling $\tau_s = 0$ in equation (62), reflecting the fact that $\alpha = 0$. | 85 |
| $\tau_{b_{max}} = \frac{\rho_{min}}{V_s} - \tau_\Delta$ | $\Delta t = \frac{\Delta x}{v}$ | 86 |
| $\frac{2\rho_{min}}{2V_0 - \rho_{min}Q} = \frac{\rho_{min}}{V_s} - \tau_\Delta$ | Substitution (70, 86). | 87 |
| $2\rho_{min}V_s = 2V_0\rho_{min} - \rho_{min}^2Q - 2V_sV_0\tau_\Delta + V_sQ\tau_\Delta\rho_{min}$ | Rearranging. | 88 |
| $Q\rho_{min}^2 + (2(V_s-V_O) - V_sQ\tau_\Delta)\rho_{min} + 2V_sV_0\tau_\Delta = 0$ | Rearranging. | 89 |

The quadratic of equation (89) can be solved using standard methods. The first and third coefficients are positive while the second coefficient is negative, so the result will either be two positive roots or two complex roots. Complex roots indicate that the bullet constants do not support the measured $\tau_\Delta$, at which point the attempted bullet type can be rejected as a possible solution for the selected bullet and muzzle pulses. If the roots are positive, we will use the smaller of the two as our minimum range for the sensor. To translate from a minimum sensor range to a minimum range on a specific bearing from the array centroid, we can use equations (22) and (31).

| | | |
|---|---|---|
| $R_i = R_c - \bar{X}_i^\tau\frac{\bar{X}_s}{R_c}$ | Equation (22), rearranged. | 90 |
| $R_i = R_c - \bar{X}_i^\tau\tilde{X}_s$ | Substitution (31, 90). | 91 |
| $R_c = R_i + \bar{X}_i^\tau\tilde{X}_s$ | Rearranging. | 92 |
| $R_{min} \geq \rho_{minz} + \bar{X}_i^\tau\tilde{X}_s$ | Generalizing for an overall minimum range. | 93 |

Equation (93) can be applied to each sensor to find the maximum value among the minimum ranges from centroid to shooter. This is $R_{min\square}$, the minimum value of $R_c$ for which we can expect to compute the objective function of equation (45). If the objective function is increasing (with increasing range) at $R_{min\square}$, three options are available:

The limiting sensor can be excluded from calculation of the objective function, decreasing $R_{min\square}$ to a point where evaluations include a minimum.

$R_{min\square}$ can be assumed to be the desired solution range.

Multiple evaluations of the objective function at greater ranges can be used to fit a polynomial, whose minimum can then be determined.

The maximum range for a given bullet-muzzle delay depends greatly on the maximum detectable propagation distance for the bullet shock, which requires another model. In this method of range estimation, we choose not to set limits on shock propagation distance and rely on the shot-direction objective function to keep ranges within reasonable limits.

6. Improvement(s) Regarding Bearing from Sensor Array to Shooter

Because the accuracy of the range estimate is dependent on the accuracy of the bearing (and optional elevation) estimate, it may be helpful to improve the bearing estimate before using it in range calculations. The method allows for the optional step of applying a Newton-Raphson correction to the initial estimate that was based on linearized range. Improvement can be achieved through the use of a full, non-linearized objective function. The following example demonstrates the case of bearing without elevation.

| | | |
|---|---|---|
| $\rho_{m.i} = \sqrt{(x_s - x_i)^2 + (y_s - y_i)^2}$ | Length of non-linearized vector from sensor to shooter. | 94 |
| $H \cong \sum_{i=0}^{n-1}(\rho_{m_i} - V_s(t_i - t_s))^2$ | Equation (23) in terms of non-linearized range. | 95 |
| $\theta \cong \begin{cases} \sin^{-1}\tilde{y}_s \\ \cos^{-1}\tilde{x}_s \end{cases}$ | Introduce angular term. | 96 |
| $\tilde{x}_s = \cos\theta$ <br> $\tilde{y}_s = \sin\theta$ | Apply functions to (96). | 97 |
| $A_i \cong 1 - \dfrac{V_s(t_i - t_s)}{\rho_{m_i}}$ | Future clutter reduction. | 98 |
| $B_i \cong R_c\tilde{x}_s(R_c\tilde{y}_s - y_i) - R_c\tilde{y}_s(R_c\tilde{x}_s - x_i)$ | Future clutter reduction. | 99 |
| $\rho_{m_i} = \sqrt{(R_c\cos\theta - x_i)^2 + (R_c\sin\theta - y_i)^2}$ | Substitution (31, 94, 97). | 100 |
| $\dfrac{d\rho_{m_i}}{d\theta} = \dfrac{1}{\rho_{m_i}}(R_c\cos\theta(R_c\sin\theta - y_i) - R_c\sin\theta(R_c\cos\theta - x_i))$ | Differentiation of (100). | 101 |
| $\dfrac{d\rho_{m_i}}{d\theta} = \dfrac{1}{\rho_{m_i}}(R_c\tilde{x}_s(R_c\tilde{y}_s - y_i) - R_c\tilde{y}_s(R_c\tilde{x}_s - x_i))$ | Substitution (97, 101). | 102 |
| $\dfrac{d\rho_{mi}}{d\theta'} = \dfrac{B_i}{\rho_{m_i}}$ | Substitution (99, 102). | 103 |
| $\dfrac{d\rho_{mi}^{-1}}{d\theta} = \dfrac{-1}{\rho_{m_i}^2}\left(\dfrac{d\rho_{m_i}}{d\theta'}\right) = \dfrac{-B_i}{\rho_{m_i}^3}$ | Chain rule and substitution (103). | 104 |
| $\dfrac{d^2\rho_{m_i}}{d\theta^2} = \dfrac{-B}{\rho_{m_i}^3}(R_c\cos\theta(R_c\sin\theta - y_i) -$ <br> $R_c\sin\theta(R_c\cos\theta - x_i)) + \dfrac{1}{\rho_{m_i}}((R_c\cos\theta)^2 -$ <br> $R_c\sin\theta(R_c\sin\theta - y_i) + (R_c\sin\theta)^2 -$ <br> $R_c\cos\theta(R_c\cos\theta - x_i))$ | Differentiation of (101) and substitution (104). | 105 |
| $\dfrac{d^2\rho_{m_i}}{d\theta^2} = \dfrac{-B_i^2}{\rho_{m_i}^3} + \dfrac{1}{\rho_{m_i}}(R_c\tilde{y}_s y_i + R_c\tilde{x}_s x_i)$ | Substitution (97, 99, 105) and simplification. | 106 |
| $\dfrac{dH}{d\theta} = \sum_{i=0}^{n-1} 2(\rho_{m_i} - V_s(t_i - t_s))\dfrac{d\rho_{m_i}}{d\theta}$ | Differentiation of (95). | 107 |
| $\dfrac{dH}{d\theta} = 2\sum_{i=0}^{n-1} A_i B_i$ | Substitution (98, 103, 107) and rearranging. | 108 |

-continued $$\frac{d^2 H}{d\theta^2} = 2 \sum_{i=0}^{n-1} \left[ (\rho_{m_i} - V_s(t_i - t_s)) \frac{d^2 \rho_{m_i}}{d\theta^2} + \left(\frac{d\rho_{m_i}}{d\theta}\right)^2 \right]$$ Differentiation of (107). 109

$$\frac{d^2 H}{d\theta^2} = 2 \sum_{i=0}^{n-1} \left[ (\rho_{m_i} - V_s(t_i - t_s)) \right.$$ Substitution (103, 106, 109). 110

$$\left. \left( \frac{-B}{\rho_{m_i}^3} + \frac{1}{\rho_{m_i}} (R_c \tilde{y}_s y_i + R_c \tilde{x}_s x_i) \right) + \left(\frac{B_i}{\rho_{m_i}}\right)^2 \right]$$

$$\frac{d^2 H}{d\theta^2} = 2 \sum_{i=0}^{n-1} \left[ A_i \left( \frac{-B_i^2}{\rho_{m_i}^2} + R_c \tilde{y}_s y_i + R_c \tilde{x}_s x_i \right) + \left(\frac{B_i}{\rho_{m_i}}\right)^2 \right]$$ Substitution (8, 110). 111

$$\frac{d^2 H}{d\theta^2} = 2 \sum_{i=0}^{n-1} \left[ (1 - A_i) \left(\frac{B_i}{\rho_{m_i}}\right)^2 + A_i (R_c \tilde{y}_s y_i + R_c \tilde{x}_s x_i) \right]$$ Rearranging. 112

$$\Delta \theta = \frac{-\sum_{i=0}^{n-1} A_i B_i}{\sum_{i=0}^{n-1} \left[ (1 - A_i) \left(\frac{B_i}{\rho_{m_i}}\right)^2 + A_i (R_c \tilde{y}_s y_i + R_c \tilde{x}_s x_i) \right]}$$ Newton-Raphson correction. 113

Exemplary Systems and Devices

Figure 6:
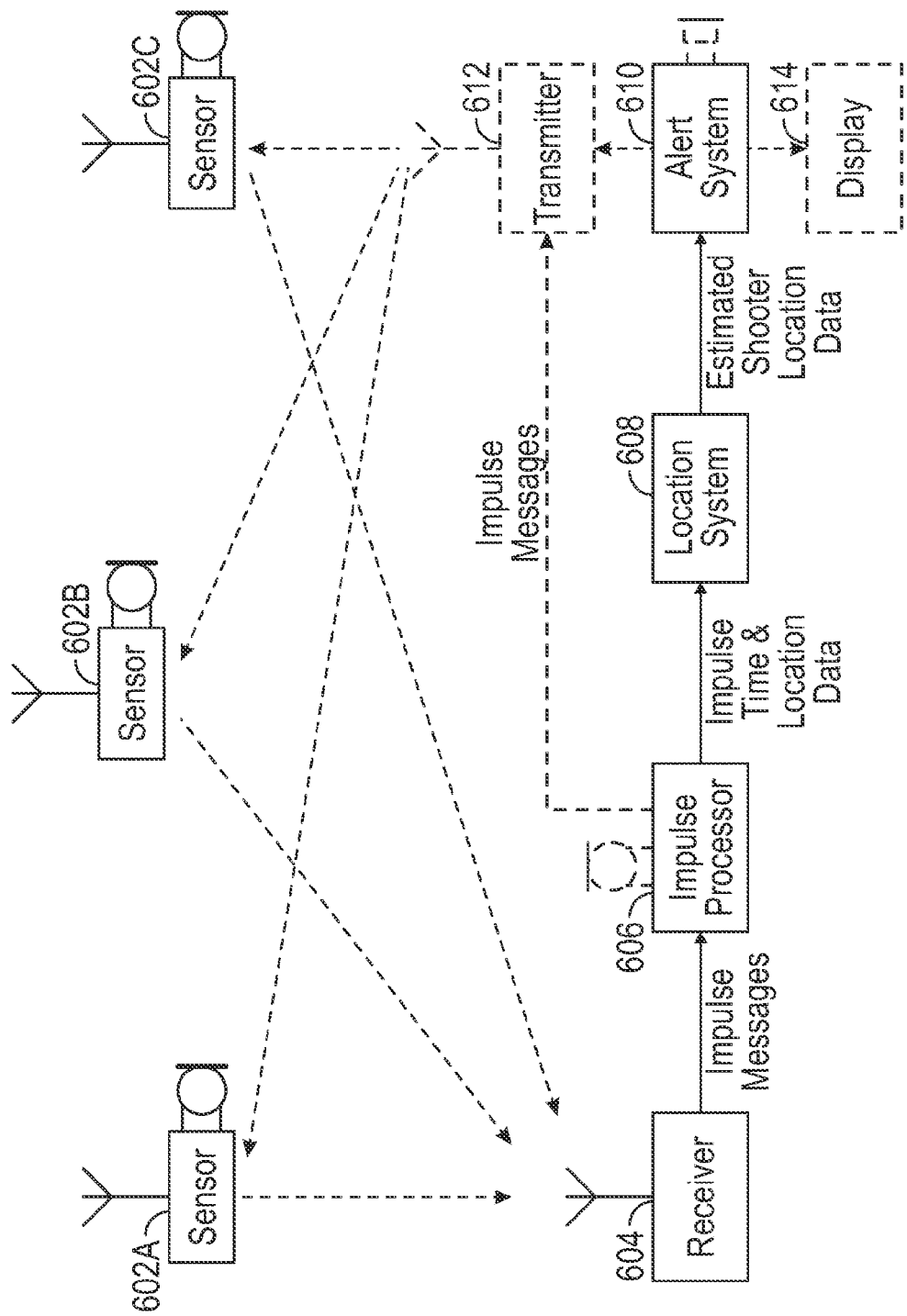
FIGS. 6-10 are block diagrams of various devices and/or systems, consistent with certain aspects related to the innovations herein.

FIG. 6 is a block diagram of an illustrative device and/or system, consistent with certain aspects related to the innovations herein. FIG. 6 shows the integration of a module (608) executing this method with various other components to create a detection and location system. Independent sensors (602A, 602B, and 602C) provide impulse detection messages through a radio network and the receiver component (604). These messages are converted into impulse time and location data which are marshaled in the impulse processor (606) for processing by the location system (608), which is an implementation of the described method. The impulse processor shows an optional microphone which may be used in conjunction with a GPS or other locator (not shown) to detect impulses on the unit and produce impulse data for the location system, as well as messages which may be forwarded to other units via the radio transmitter (612). Output of the location system goes to an alert system (610) which can display alerts and location data to a user via audible alerts and/or visual warnings using an attached display (614). The alert system may also dispatch location data messages to fellow sensors and other interested units via the transmitter.

The following paragraphs describe a number of possible variations in implementation. The list is meant to be representative, but not exhaustive.

Figure 7:
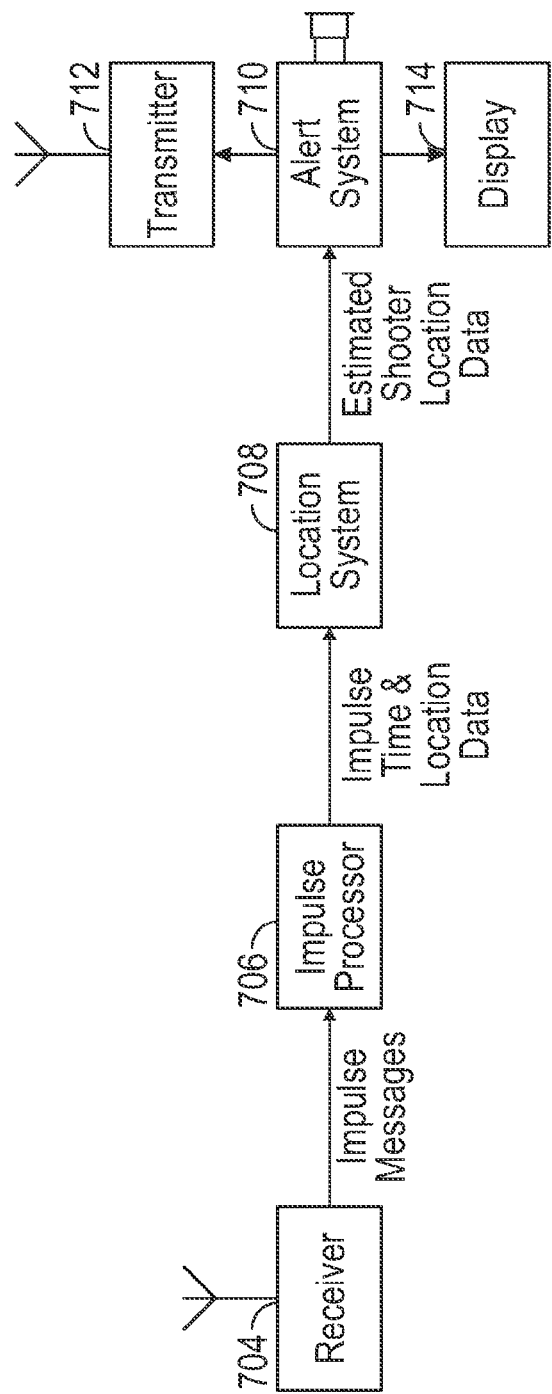

FIG. 7 is another block diagram of an illustrative device and/or system, consistent with certain aspects related to the innovations herein. FIG. 7 shows a more specific implementation where the unit does not function as a sensor in the network, but does have its own integrated radio. Such might be the case for a device mounted in a aircraft or running on a server at a police station or other type of headquarters. The receiver (704) passes impulse messages to the impulse processor (706), which converts them into impulse time and location data which are marshaled for processing by the location system (708). Output of the location system goes to an alert system (710) which can display alerts and location data to a user via audible alerts and/or visual warnings using an attached display (714). The alert system may also dispatch location data messages to the source sensors and other interested parties via the transmitter (712).

Figure 8:
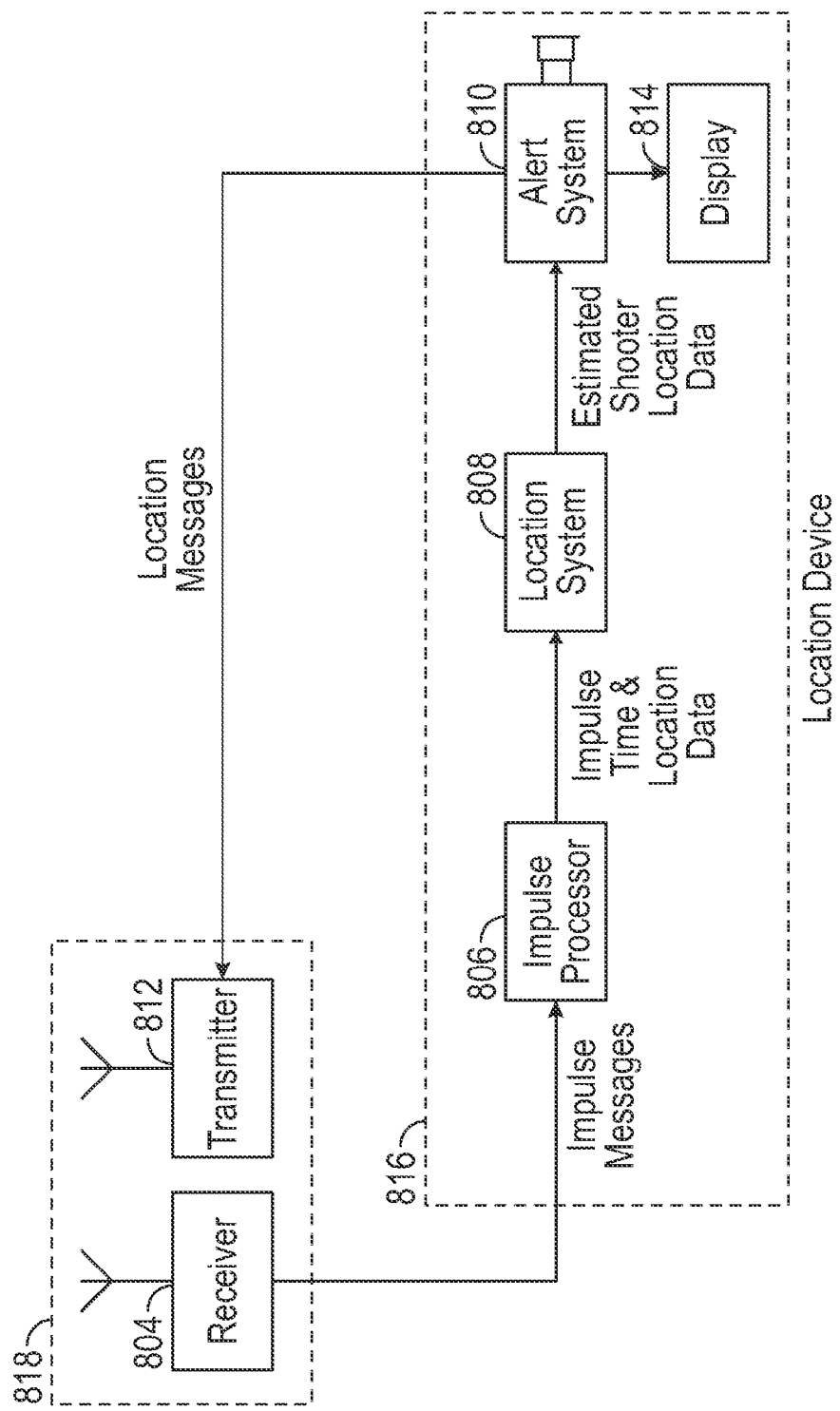

FIG. 8 is still another block diagram of an illustrative device and/or system, consistent with certain aspects related to the innovations herein. In FIG. 8, we have a similar setup, but the radio (818), implementing both receiver (804) and transmitter (812) functions is housed in a separate unit, communicating with the location device (816) using a parallel port, serial port, USB, Bluetooth, or similar communication path. Such an arrangement allows for flexibility to operate on multiple types of radio networks and can, in some instances, free the unit from implementation of encryption. The impulse processor (806), location system (808), alert system (810), and display (814) functions are the same as described above.

Figure 9:
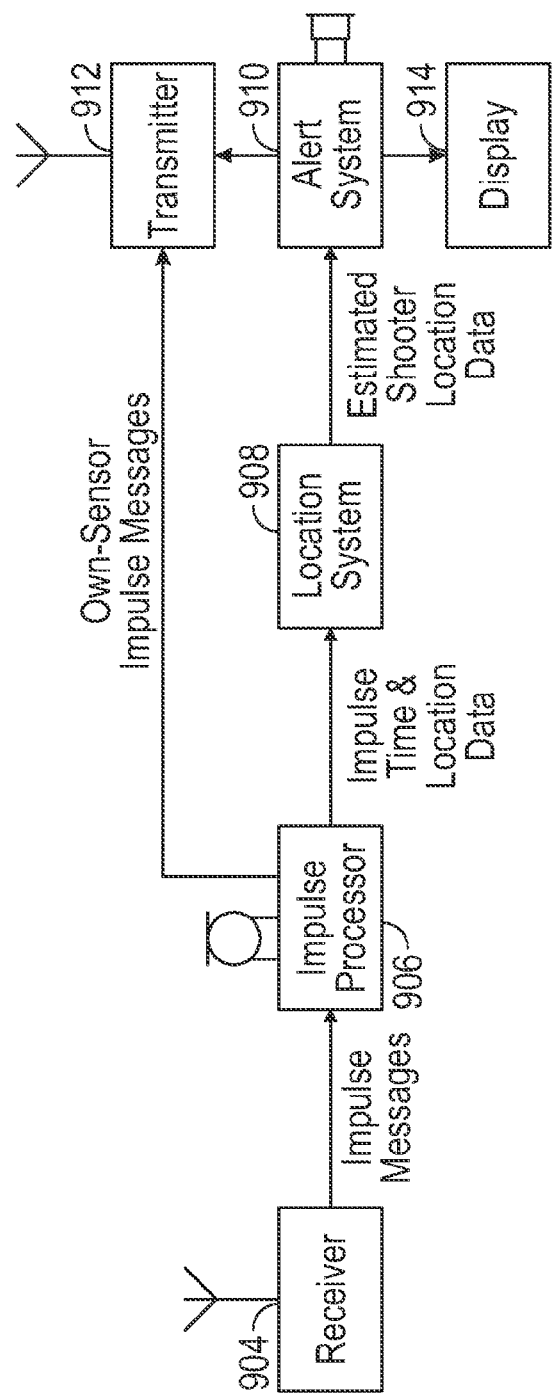

FIG. 9 is yet another block diagram of an illustrative device and/or system, consistent with certain aspects related to the innovations herein. In FIG. 9 we have a fully integrated unit with its own radio (904 and 912). It also boasts sensor hardware in the form of a microphone, audio processing, and a GPS or other locator incorporated into the impulse processor (906). In addition to undergoing normal processing through the location system (908), the locally detected impulses are forwarded via the transmitter (912) to other units for their own processing. The alert (910) and display (914) functions are the same as described above. This, or a similar setup with the modification of a separate radio, as shown above, might be a preferred implementation for a hand-carried or soldier-mounted version.

Figure 10:
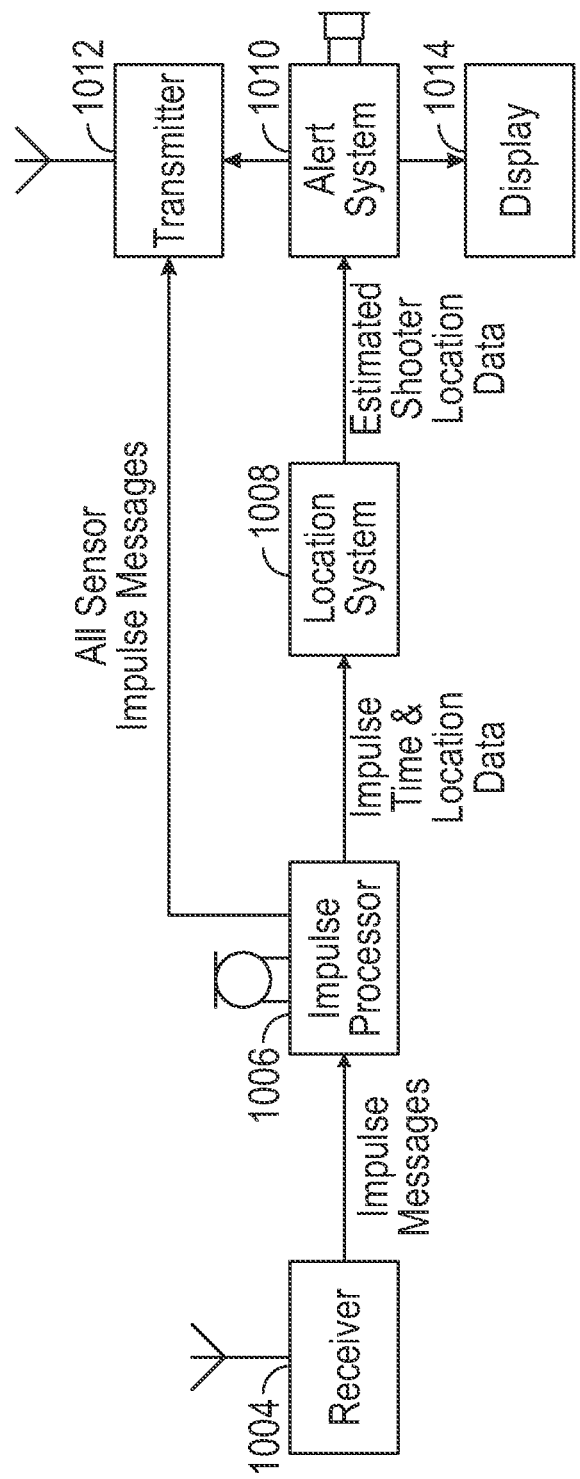

FIG. 10 is also a block diagram of an illustrative device and/or system, consistent with certain aspects related to the innovations herein. FIG. 10 differs from FIG. 9 in that the impulse processor (1006) not only forwards its own impulse detections via the transmitter (1012), it also forwards those of other sensors (upon first receiving them). In this way, it may be used as part of a mesh-style network. Function of the receiver (1004), location system (1008), alert system (1010), and display (1014) are otherwise similar to those of the system in FIG. 10.

Features/Innovations Consistent with One or More Implementations

The linearized innovations herein yield implementations, for determining the bearing and (optionally) elevation from a small array to a shooter, which provide increased accuracy over using a plane-wave model to match muzzle-blast times of arrival, without significantly increasing processing time.

The speed and accuracy of these linearized approaches of determining bearing and (optionally) elevation allow them to be applied to large numbers of sensor and pulse subsets to extract muzzle pulses associated with an individual shot from large pulse collection(s), such as in noisy environments.

Further, such linearized approaches of determining bearing and (optionally) elevation quickly locate the arrival direction within the accuracy required to begin a further iterative optimization of either the bearing or elevation at a specified range. Several such implementations use a Newton-Raphson optimization which may be performed quickly and provides rapid convergence, allowing repeated application to bearing, then elevation (or elevation, then bearing) in successive iterations until a desired level of convergence is achieved.

According to some implementations, the conversion of the estimated shooter location and the measured time delta (between bullet shock and muzzle blast arrivals at a sensor) to an estimated miss angle is an integral part of the solution. Further, the described, exemplary use of the derived quintic equation to accomplish this allows it to be done at a small processing cost. This is important in such implementations, as it must be done for each sensor at each evaluated range during the one-dimensional search.

Moreover, implementations including the described use of the computed minimum range from the array centroid to the shooter greatly improve the speed and stability of the one-dimensional search on range.

Additionally, some innovations herein include an efficient dot-product method for converting sensor positions, the shooter position estimate, and the vector of estimated miss angles into a linear system which can be readily solved for a best-fit shot trajectory vector.

Once the trajectory vector has been determined and normalized, linear equations used herein to find it are easily converted into equations defining a vector of residuals which can be squared and summed as an objective function. This allows the coefficients to be reused in the quick evaluation of the objective function for the range search.

In some implementations, although the sensors utilized in the range computation provide/involve both bullet and muzzle impulses, additional sensors that only detect muzzle impulses may be involved in the bearing estimate. This may increase accuracy, particularly in cases where the bullet passes to one side of the array or where the array is spread out.

As set forth above, the innovations herein may be implemented via one or more software components/modules, sensors, devices, base/host computing components, appliances, other components, or distributed between such elements. When implemented as a device or base/host computing component, such a device or component may include elements such as a general-purpose CPU, RAM, etc. found in general-purpose computers, and/or FPGAs and/or ASICs found in more specialized computing devices. In implementations where the innovations reside on one or more platforms, such platforms may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, circuitry, computing/processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: various software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of software, logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The invention claimed is:

1. A method for processing arrival time information associated with potential weapon fire in a gunshot location system, the method comprising:
   processing detected impulses from sensors of the gunshot location system associated with one or more potential weapon fire events;
   establishing ToA windows for a plurality of the detected impulses;
   grouping select impulses of the detected impulses within the ToA windows into potential bullet impulse and muzzle impulse times of arrival pairs for each sensor;
   for each combination of times of arrival that are potentially muzzle blast ToAs from sets of sensors, directly determining bearing by solving a time-difference-of-arrival problem to provide a potential bearing to a shooter;
   for each potential bearing to the shooter and for each of a set of prospective weapon types, applying a one dimensional search ("ODS") using multiple combinations of same-sensor bullet impulse ToAs that create potentially matching pairs with the previously combined muzzle impulse ToAs;
   performing processing to determine best candidate solutions, including estimated source location of the weapon fire, using differences between bullet-shock arrival time and muzzle-blast arrival time for sensor impulse sets analyzed with regard to each prospective weapon type, the sensor impulse sets being pairings of bullet pulse arrival times and muzzle pulse arrival times received at each sensor; and
   providing a best candidate solution as an output;
   wherein determining the best candidate solutions includes calculating a miss angle by formulating a 5th-degree polynomial and solving for a smallest, positive real root;
   wherein the processing includes calculating between potential location of a shooter associated with the detected impulses and the sensors using a linear expression for determining sensor-to-shooter range defined by:

$$R_i = R_c - \frac{1}{R_c} \overline{X}_i^T \overline{X}_s$$

wherein $R_c$ is a location constant, T is a time constant, $\overline{X}_i$ is a set of small vectors representing positions of the sensors relative to an array centroid and $\overline{X}_s$ is a position of the shooter relative to the array centroid.

2. The method of claim 1 wherein either or both estimated source location and weapon type information regarding a weapon fire incident can be determined via use of a sampling rate less than that required for traditional gunshot location systems having multi-microphone, fixed-array sensors.

3. The method of claim 1 wherein the processing performed includes performing processing that compares resulting ODS objective-function values or combined vector-solution self-consistency and ODS objective-function values, to determine best independent combinations of solution results.

4. The method of claim 1 further comprising:
removing ToA pairs based on one or both of an established minimum shooter range and an established maximum shooter range.

5. The method of claim 4 wherein the range or ranges may be set as a function of weapon type.

6. The method of claim 1 further comprising, after determining the bearing to the shooter, performing processing configured to discard any bearing solutions having low self-consistency.

7. The method of claim 1 further comprising:
performing iterative processing to eliminate candidates from possible bearings to provide a reduced set of potential bearings.

8. The method of claim 1 further comprising reporting one or more of shooter position, weapon type and shot direction to an alerting interface.

9. The method of claim 1 wherein the processing utilizes a bullet-velocity model defined by:

$$\frac{dy}{dx} = -kv^{\frac{3}{2}}$$

wherein dy/dx is a decaying-velocity model, k is a decay coefficient, and v is a bullet velocity.

10. The method of claim 1 wherein the 5th-degree polynomial is defined by:

$$f(\tau_b) \stackrel{def}{=} -Q^3\tau_b^5 + Q^2(QT-5)\tau_b^4 + 4Q(QT-2)\tau_b^3 + \left(Q^2P + 4\left(QT + \left(\frac{V_0}{V_s}\right)^2 - 1\right)\right)\tau_b^2 + 4QP\tau_b + 4P = 0,$$

wherein $\tau_b$ is a variable corresponding to bullet travel time up to a point where a detected shock pulse was created, Q and $V_0$ are constants defined per weapon type, $V_s$ is estimated speed of sound, and T and P are constants derived from pulse arrival times and assumed shooter distance, with P incorporating speed of sound.

11. A system comprising:
a computing component; and
one or more computer readable media and/or storage elements embodying computer readable instructions executable in connection with the computing component to process information associated with a weapon fire incident, the computer readable instructions including instructions for:
processing detected impulses from sensors of the gunshot location system associated with one or more potential weapon fire incidents;
establishing ToA windows for a plurality of the detected impulses;
grouping select impulses of the detected impulses within the ToA windows into potential bullet impulse and muzzle impulse times of arrival pairs for each sensor;
for each combination of times of arrival that are potentially muzzle blast ToAs from sets of sensors, directly determining bearing by solving a time-difference-of-arrival problem to provide a potential bearing to a shooter;
for each potential bearing to the shooter and for each of a set of prospective weapon types, applying a one dimensional search ("ODS") using multiple combinations of same-sensor bullet impulse ToAs that create potentially matching pairs with the previously combined muzzle impulse ToAs; and
performing processing to determine best candidate solutions, including estimated source location of the weapon fire, using differences between bullet-shock arrival time and muzzle-blast arrival time for sensor impulse sets analyzed with regard to each prospective weapon type, the sensor impulse sets being pairings of bullet pulse arrival times and muzzle pulse arrival times received at each sensor,
wherein determining the best candidate solutions includes calculating a miss angle by formulating a 5th-degree polynomial and solving for a smallest, positive real root;
wherein the processing utilizes a bullet-velocity model defined by:

$$\frac{dy}{dx} = -kv^{\frac{3}{2}}$$

wherein dy/dx is a decaying-velocity model, k is a decay coefficient, and v is a bullet velocity.

12. The system of claim 11 wherein the processing performed includes performing processing that compares resulting ODS objective-function values or combined vector-solution self-consistency and ODS objective-function values, to determine best independent combinations of solution results.

13. The system of claim 11 further comprising:
removing ToA pairs based on one or both of an established minimum shooter range and an established maximum shooter range.

14. The system of claim 13 wherein the range or ranges may be set as a function of weapon type.

15. The system of claim 11 further comprising, after determining the one or more bearing to the shooter, performing processing configured to discard any bearing solutions having low self-consistency.

16. The system of claim 11 further comprising:
performing iterative processing to eliminate candidates from possible bearings to provide a reduced set of potential bearings.

17. The system of claim 11 wherein the system is configured to report one or more of shooter position, weapon type and shot direction to an alerting interface.

18. The system of claim 11 wherein the 5th-degree polynomial is defined by:

$$f(\tau_b) \overset{def}{=} -Q^3\tau_b^5 + Q^2(QT-5)\tau_b^4 + 4Q(QT-2)\tau_b^3 + \left(Q^2P + 4\left(QT + \left(\frac{V_0}{V_s}\right)^2 - 1\right)\right)\tau_b^2 + 4QP\tau_b + 4P = 0,$$

wherein $\tau_b$ is a variable corresponding to bullet travel time up to a point where a detected shock pulse was created, Q and $V_0$ are constants defined per weapon type, $V_s$ is estimated speed of sound, and T and P are constants derived from pulse arrival times and assumed shooter distance, with P incorporating speed of sound.

19. A method for processing arrival time information associated with potential weapon fire in a gunshot location system, the method comprising:

processing detected impulses from sensors of the gunshot location system associated with one or more potential weapon fire incidents;

establishing ToA windows for a plurality of the detected impulses;

grouping select impulses of the detected impulses within the ToA windows into potential bullet impulse and muzzle impulse times of arrival pairs for each sensor;

for each combination of times of arrival that are potentially muzzle blast ToAs from sets of sensors, directly determining bearing by solving a time-difference-of-arrival problem to provide a potential bearing to a shooter;

for each potential bearing to the shooter and for each of a set of prospective weapon types, applying a one dimensional search ("ODS") using multiple combinations of same-sensor bullet impulse ToAs that create potentially matching pairs with the previously combined muzzle impulse ToAs;

performing processing to determine best candidate solutions, including estimated source location of the weapon fire, using differences between bullet-shock arrival time and muzzle-blast arrival time for sensor impulse sets analyzed with regard to each prospective weapon type, the sensor impulse sets being pairings of bullet pulse arrival times and muzzle pulse arrival times received at each sensor; and providing a best candidate solution as an output;

wherein determining the best candidate solutions includes calculating a miss angle by formulating a 5th-degree polynomial defined by:

$$f(\tau_b) \overset{def}{=} -Q^3\tau_b^5 + Q^2(QT-5)\tau_b^4 + 4Q(QT-2)\tau_b^3 + \left(Q^2P + 4\left(QT + \left(\frac{V_0}{V_s}\right)^2 - 1\right)\right)\tau_b^2 + 4QP\tau_b + 4P = 0,$$

and solving for a smallest, positive real root, wherein $\tau_b$ is a variable corresponding to bullet travel time up to a point where a detected shock pulse was created, Q and $V_0$ are constants defined per weapon type, $V_s$ is estimated speed of sound, and T and P are constants derived from pulse arrival times and assumed shooter distance, with P incorporating speed of sound.

20. The method of claim 19 wherein the processing includes calculating between potential location of a shooter associated with the detected impulses and the sensors using a linear expression for determining sensor-to-shooter range defined by:

$$R_i = R_c - \frac{1}{R_c}\overline{X}_i^T \overline{X}_s$$

wherein $R_c$ is a location constant, T is a time constant, $\overline{X}_i$ is a set of small vectors representing positions of the sensors relative to an array centroid and $\overline{X}_s$ is a position of the shooter relative to the array centroid.

21. The method of claim 19 further comprising:

removing ToA pairs based on one or both of an established minimum shooter range and an established maximum shooter range.

22. The method of claim 21 wherein the range or ranges may be set as a function of weapon type.

23. The method of claim 19 further comprising, after determining the bearing to the shooter, performing processing configured to discard any solutions having low self-consistency.

24. The method of claim 19 further comprising:

performing iterative processing to eliminate candidates from possible bearings to provide a reduced set of potential bearings.

25. The method of claim 19 further comprising reporting one or more of shooter position, weapon type and shot direction to an alerting interface.

26. The method of claim 19 wherein the processing utilizes a bullet-velocity model defined by:

$$\frac{dy}{dx} = -kv^{\frac{3}{2}}.$$

27. The method of claim 19 wherein the processing includes comparison of resulting ODS objective-function values or combined vector-solution self-consistency and ODS objective-function values, to determine best independent combinations of solution results.

* * * * *